United States Patent Office 2,907,738
Patented Oct. 6, 1959

2,907,738

MIXED RESIN ACID ESTERS OF 4,4-BIS(4-HYDROXYARYL) PENTANOIC ACID

Sylvan O. Greenlee, Racine, Wis., assignor to S. C. Johnson & Son, Inc., Racine, Wis.

No Drawing. Application June 30, 1955
Serial No. 519,279

9 Claims. (Cl. 260—24)

This invention relates to new compositions which are mixed esters of polyhydric alcohols, natural resin acids, and hydroxyaryl-substituted aliphatic acids.

An object of this invention is to produce new compositions from natural resin acids, polyhydric alcohols and hydroxyaryl-substituted aliphatic acids which are valuable as intermediates in the production of other more complex compositions.

Another object of this invention is to produce new compositions of the hereinbefore described character which are valuable in the manufacture of more complex reaction products having unusually good chemical resistance, hardness, gloss, etc.

These and other objects and advantages are attained by the present invention, various novel features of which will become more fully apparent from the following description, with particular reference to specific examples which are to be considered as illustrative only.

The compositions of this invention, being esters of polyhydric alcohols and mixtures of natural resin acids and hydroxyaryl-substituted aliphatic acids, are relatively high molecular weight resinous polyhydric phenols. The number of phenolic groups per molecule are dependent on the number of alcoholic hydroxyl groups present in the polyhydric alcohol esterified, as well as on the amounts and proportions of natural resin acid and hydroxyaryl-substituted aliphatic acid used in the preparation of the esterified product.

The mixed esters of this invention combine within the same chemical molecule natural resin acid esters and a phenolic residue, the natural resin acid ester portion being similar to the natural resin acid portion present in the so-called ester gums which are natural resin acid esters of polyhydric alcohols. This property renders the compositions of this invention particularly valuable in the manufacture of complex products such as coating and molding compositions, where the natural resin acid esters are desirable for the purpose of contributing hardness and gloss to the finished product. The phenolic residues present in the compositions and introduced by the hydroxyaryl-substituted aliphatic acids contribute reactive phenolic hydroxyl groups which for the most part do not enter into the esterification reaction used in the preparation of the mixed esters of this invention. These functional groups permit further reaction between the mixed esters of this invention and such materials as aldehydes, epoxides, and carboxylic acids to yield additional complex products. Reaction with aldehydes, either in the presence or absence of other compounds capable of polymerization with aldehydes, gives compositions which are valuable constituents of protective coatings and molding resins. Similarly, the phenolic hydroxyl groups of the phenolic residues may be reacted with polyepoxide compositions to give highly polymerized products containing within the same molecule the natural resin acid ester residues. Esterification of the phenolic hydroxyl groups of the phenolic residue with dibasic acids would also give polymerization in which the natural resin acid ester becomes an intimate part of the final polymer chemical composition. Such esterification reactions involving the phenolic hydroxyl groups would conveniently be carried out by heating with a mixture of the dibasic acid and acetic anhydride.

The hydroxyaryl-substituted aliphatic acids contemplated for use in preparing the desired resinous polyhydric phenols have two hydroxyphenyl groups attached to a single carbon atom. The preparation of these substituted acids may be most conveniently carried out by condensing a keto-acid with the desired phenol. Experience in the preparation of bisphenols and related compounds indicates that the carbonyl group of the keto-acid must be located next to a terminal carbon atom in order to obtain satisfactory yields. A terminal carbon atom as used herein refers to primary carbon atoms other than the carboxyl carbon atom of the keto-acid. Prior applications, Serial Nos. 464,607 and 489,300, filed October 25, 1954, and February 18, 1955, respectively, disclose a number of illustrative compounds suitable for use as the hydroxyaryl-substituted acid, and methods of preparing the same. These materials, which are referred to for convenience as Diphenolic Acid, or DPA a trademark of S. C. Johnson & Son, Inc., comprise the condensation products of levulinic acid and phenol, substituted phenols or mixtures thereof. It is to be understood that the phenolic nuclei of the Diphenolic Acid may be substituted with any groups which will not interfere with the esterification reactions. For example, the nuclei may be alkylated as disclosed in Serial No. 489,300 or they may be halogenated. The Diphenolic Acid derived from 1 mol of levulinic acid and 2 mols of phenol is particularly advantageous in that it may be readily prepared to a high degree of purity, whereas the use of substituted phenols, such as the alkylated products, usually results in mixed compositions which are less readily purified. On the other hand, there are cases where the Diphenolic Acid derived from alkylated phenols are more desirable than those derived from the nonalkylated product on the basis that the alkyl groups tend to give better organic solvent solubility, flexibility, and better water resistance.

The natural resin acids which may be used with these hydroxyaryl-substituted acids in the co-esterification of the polyhydric alcohols are illustrated by the commercial grades of rosin and other natural-occurring acid resins, such as the kauri, copal, damar, and Congo gums. Typical commercial grades of rosin, for example, have acid values of around 150–175. Acid values as used herein are defined as the number of milligrams of KOH required to neutralized the acid present in a one-gram sample. Typical damar gums have acid values ranging from 18 to 60. Kauri gums have acid values of from 60–80, while copal gums have acid values in the range of 105–130. The essential composition of all these natural-occurring resin acids are cyclic terpenic type acids of which abietic acid is fairly typical.

The polyhydric alcohols may be the nonresinous type or the resinous type. These polyhydric alcohols, because of their polyfunctionality, will esterify with natural resin acids and hydroxyaryl-substituted acids to give a resinous phenolic product. Illustrative of the nonresinous type polyhydric alcohols are such materials as ethylene glycol, polyethylene glycols, propylene glycol, polypropylene glycols, 1,3-butane diol, 2,5-pentane diol, 1,6-hexane diol, neopentyl glycol, glycerol, erythritol, pentaerythritol, polypentaerythritols, sorbitol, mannitol, alpha methyl glucoside, polyallyl alcohols, diethanolamine, triethanolamine, and tetramethylol cyclohexanol.

The resinous polyhydric alcohols which may be used in the preparation of the subject esters may be illustrated by such materials as the resinous reaction products of bis(4-hydroxyphenyl)isopropylidene with ethylene chlorohydrin or glycerol monochlorohydrin. The reaction of the same dihydric phenol with epichlorohydrin or glycerol dichlorohydrin gives resinous polyhydric alcohols which are polymeric polyhydric alcohols and which in some cases, in addition to the alcholic hydroxyl groups, contain epoxide groups. (The epoxide-containing products are well illustrated by the commercially available Epon resins marketed by Shell Chemical Corporation.) The preparation of these resinous polyhydric alcohols are described in U.S. Patents 2,456,408, 2,503,726, 2,615,008, 2,668,805, 2,668,807 and 2698,315.

Other resinous polyhydric alcohols which may be employed may be illustrated by those which are prepared by the reaction of phenol-formaldehyde condensates with chlorohydrins. For example, an alkylphenol may be condensed with formaldehyde, followed by treatment of an alkaline solution of this intermediate methylol derivative with a chlorohydrin, such as glycerol monochlorohydrin, to yield after condensation a polymeric polyhydric alcohol. This resinous polyhydric alcohol may then be used in esterification with the diphenolic acids to prepare the subject resinous polyhydric phenols.

A typical formula for a composition herein described may be illustrated by the following reaction between equal molar portions of ethylene glycol, abietic acid, and 4,4-bis(4-hydroxyphenyl)pentanoic acid. Abietic acid is the chief acid ingredient of commercial rosin and is typical of the terpenic type acids present in the natural resin acids.

Esterification of either the nonresinous or resinous polyhydric alcohols with Diphenolic Acid and natural resin acids is conveniently carried out by direct heating at temperatures of from 190–275° C. under conditions where the water produced during condensation is continuously removed as it is formed. In the case where epoxide groups of, for example, a resinous composition of the Epon resin type produced by Shell Chemical Corporation are partially esterified only to the extent of one carboxyl group reacting with one epoxide group, lower temperatures may be used and no water is formed since the reaction of the carboxyl group with the epoxide group is that of direct addition with the formation of an ester-linkage and a free hydroxyl group. Since the Diphenolic Acid and the polyhydric alcohols have boiling points which are in all cases above 190° C., the water may be removed by permitting it to volatilize during esterification. Removal of the water may also be facilitated by continuously bubbling through the reaction mixture during esterification a stream of inert gas, such as carbon dioxide or nitrogen. It is also sometimes convenient to facilitate the water removal by carrying out the reaction in a vessel provided with condenser attached thereto through a water trap, adding a sufficient amount of a volatile, water-insoluble solvent to give reflux at the esterification temperature, continually removing the water by azeotropic distillation and permitting the solvent to return to the reaction mixture after having dropped the water in the water trap.

The order of addition of the various ingredients, Diphenolic Acid, resin acids, and polyhydric alcohols, to each other may be varied. It is sometimes advantageous to vary this order of addition to obtain optimum results

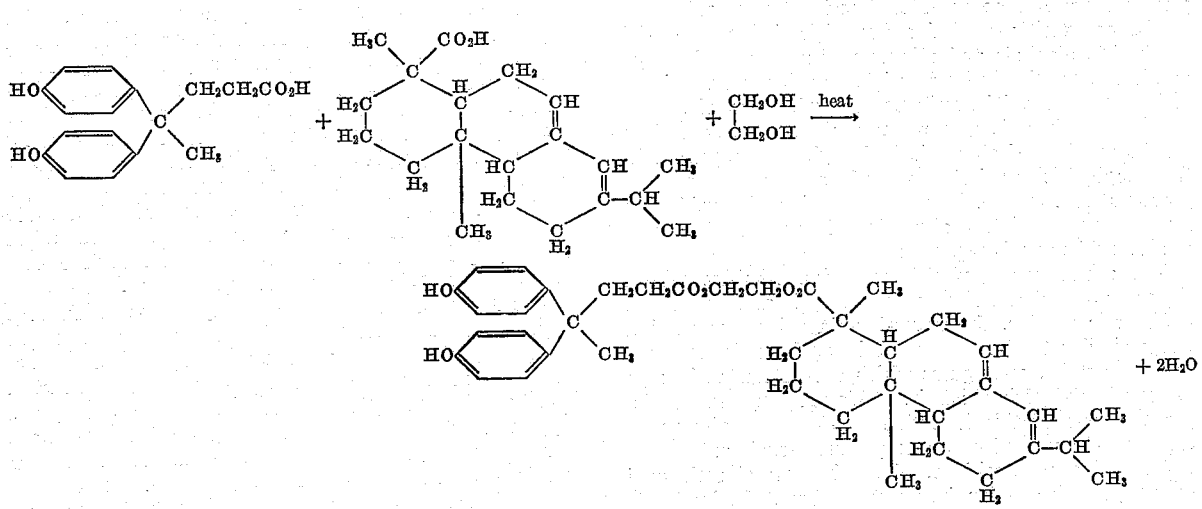

From the above formula it will be obvious that use of more complex polyhydric alcohols, such as glycerol, pentaerythritol, and the polypentaerythritols, would give higher molecular weight products in which the ratio of Diphenolic Acid to natural resin acid may be varied through wide ranges. It is understood that the compositions obtained by co-esterification of polyhydric alcohols with Diphenolic Acid and the natural resin acids give mixed products, including to some extent esterification of the phenolic hydroxyl groups of Diphenolic Acid with the carboxyl groups of diphenolic acid itself as well as esterification of the alcoholic hydroxyl groups by the natural resin acids. For the most part, however, the more reactive alcoholic hydroxyl groups of the polyhydric alcohols tend to esterify to a greater extent than the phenolic hydroxyl groups. These compositions are valuable in formulating useful products in the coatings, molding, and adhesive field.

with the particular combination of ingredients used. In the art of high temperature esterification, it is sometimes advantageous to use certain esterification catalysts, and these may be used in the preparation of the compositions of this invention.

The following examples will serve to illustrate this invention, however, it should be understood that the invention is not intended to be limited thereby. In the examples, proportions expressed are parts by weight unless otherwise indicated.

Examples I to VI illustrate the preparation of some polyhydric alcohol esters of mixtures of Diphenolic Acid and natural resin acid esters. These reactions are in all cases carried out in vessels provided with a thermometer, a mechanical agitator, and a condenser attached through a water trap. Inert gas was bubbled through the reaction mixtures throughout esterification so as to remove water formed in the esterification.

Example I

A mixture of 143 parts of 4,4-bis(4-hydroxyphenyl) pentanoic acid, 330 parts of a commercial grade of rosin having an acid value of 160, and 51 parts of glycerol was esterified to an acid value of 16.2 to yield a hard, resinous product having a softening point of 95° C. The softening points as used therein were obtained by Durrans' Mercury Method (Journal of Oil and Colour Chemists Association, 12, 173–175 [1929]).

Example II

A mixture of 143 parts of 4,4-bis(4-hydroxyphenyl)pentanoic acid, 165 parts of commercial rosin, and 34 parts of ethylene glycol was esterified to an acid value of 7 yielding a product having a softening point of 81° C.

Example III

In a reaction vessel provided with a mechanical agitator was placed 452 parts of bis(4-hydroxyphenyl)isopropylidene dissolved in 1500 parts of water containing 82 parts of sodium hydroxide. The temperature of the continuously agitated solution was raised to 60° C. and 93 parts of epichlorohydrin was added slowly at 60–65° C. After addition of the epichlorohydrin was complete, the temperature was gradually raised to 95° C. and held at this temperature for a period of 1 hour. A solution of 82 parts of sodium hydroxide dissolved in 500 cc. of water was added, lowering the temperature to 73° C. at which point 161 parts of ethylene chlorohydrin was added slowly over a period of 28 minutes. After all of the ethylene chlorohydrin had been added, the temperature was gradually raised to 95° C. and held for 1 hour. The unreacted caustic was neutralized by adding 100 parts of 37% aqueous HCl and the product was washed several times with hot water to remove the salt and excess HCl. The product was finally dried by heating with agitation giving 558 parts of a product having a softening point of 56° C.

To the 558 parts of this polymeric polyhydric alcohol was added 360 parts of 4,4-bis(4-hydroxyphenyl)pentanoic acid and 415 parts of a commercial grade of rosin having an acid value of 160, and the resulting mixture esterified to an acid value of 6.4. The product had a softening point of 102° C.

Example IV

A mixture of 143 parts of 4,4-bis(4-hydroxyphenyl)pentanoic acid, 165 parts of commercial rosin, and 37 parts of pentaerythritol was esterified to an acid value of 7.5 to yield a product having a melting point of 126° C.

Example V

A mixture of 86 parts of 4,4-bis(4-hydroxyphenyl)pentanoic acid, 101 parts of commercial rosin, and 174 parts of Epon 1004 was esterified to an acid value of 12 giving a product having a softening point of 149° C. Epon 1004 is a resinous polyhydric alcohol containing some epoxide and prepared from epichlorohydrin and bis(4-hydroxyphenyl)isopropylidene. Epon 1004 has a softening point of 95–105° C. and an epoxide equivalent weight of 870–1025 as specified by its manufacturer, the Shell Chemical Corporation.

Example VI

A mixture of 174 parts of Epon 1004 and 101 parts of commercial rosin was esterified to an acid value of 19 at which point 86 parts of 4,4-bis(4-hydroxyphenyl)pentanoic acid was added and esterification continued until an acid value of 139 was reached, giving a product having a softening point of 131° C.

The remaining examples illustrate the preparation of more complex products by the reaction of the mixed esters of this invention with formaldehyde, to produce a resinous composition useful in the manufacture of protective coatings. It will be understood, of course, that the phenolic hydroxyl groups of the mixed esters may be reacted with other materials such as epoxides or other acids, to give various other reaction products. These products generally possess the hardness and gloss characteristic of natural resin esters and show other exceptional properties such as flexibility, chemical resistance, etc.

Example VII

A mixture of 100 parts of the resinous product of Example I, 21 parts of 38% aqueous formaldehyde, .063 part of oxalic acid and 17 parts of xylol was heated with continuous agitation for a period of 1 hour and 30 minutes at 95° C., after which the water layer was removed by decantation. The organic resin layer was heated with agitation to 105° C. at a reduced pressure of around 30–40 mm. in order to remove the last traces of water.

A mixture of 10 parts of this formaldehyde reaction product and 10 parts of linseed oil was heated with agitation for 30 minutes at 240–280° C. at which point 10 parts of China-wood oil was added and agitation continued until the mixture had cooled to 228° C., and this temperature held for 15 minutes. This product was dissolved to 50% nonvolatile content in a solvent composed of equal weights of xylol and a high boiling naphtha (boiling range 145–225° C. and an aniline point of 60° C. to a viscosity of A–3 Gardner-Holdt bubble viscometer). This varnish was treated with .03% cobalt naphthenate drier and .3% lead naphthenate drier based on nonvolatile content, to give a product which, when spread in .002" wet film thickness and air-dried overnight, gave a flexible film which withstood boiling water for a period of 1 hour.

Example VIII

Replacing the resinous product of Example I with the resinous product of Example II in the reaction with formaldehyde, and final cooking with the drying oils, as in Example VII, gave a product which formed flexible air-dried films which withstood boiling water for a period of 1 hour.

The mixed esters of this invention may be modified to some extent by incorporating with the esters other constituents. These constituents may be inert constituents such as fillers, pigments, or certain plasticizers, or they may contain functional groups and enter into the esterification of the polyhydric alcohols with natural resin acids and hydroxyaryl-substituted acids so as to be chemically carried by the mixed esters of this invention.

It should be appreciated that while there are above disclosed only a limited number of embodiments of this invention, it is not intended to be restricted thereto, and that it is intended to cover all modifications of the invention which would be apparent to one skilled in the art and that come within the scope of the appended claims.

It is claimed and desired to secure by Letters Patent:

1. A new composition of matter comprising the mixed ester of a fusible polyhydric alcohol, a natural resin acid, and a pentanoic acid consisting essentially of 4,4 bis(4-hydroxyaryl) pentanoic acid wherein the hydroxyaryl radical is a hydroxyphenyl radical and is free from substituents other than alkyl groups of from 1–5 carbon atoms.

2. The composition of claim 1 where the pentanoic acid consists essentially of 4,4 bis(4-hydroxyaryl)pentanoic acid wherein the hydroxyaryl radical is a hydroxyphenyl radical and is free from substituents other than alkyl groups of one carbon atom.

3. The composition of claim 1 wherein the pentanoic acid is 4,4 bis(4-hydroxyphenyl)pentanoic acid.

4. The composition of claim 3 wherein the natural resin acid is rosin.

5. The composition of claim 3 wherein the natural resin acid is abietic acid.

6. The composition of claim 3 wherein the polyhydric alcohol is a polyglycidyl ether of a member of the group consisting of polyhydric phenols and polyhydric alcohols.

7. The composition of claim 3 wherein the polyhydric alcohol is glycerol.

8. The composition of claim 3 wherein the polyhydric alcohol is ethylene glycol.

9. The composition of claim 3 wherein the polyhydric alcohol is pentaerythritol.

No references cited.

UNITED STATES PATENT OFFICE
CERTIFICATE OF CORRECTION

Patent No. 2,907,738

October 6, 1959

Sylvan O. Greenlee

It is hereby certified that error appears in the printed specification of the above numbered patent requiring correction and that the said Letters Patent should read as corrected below.

Column 2, line 52, for "neutralized" read -- neutralize --; column 3, line 25, for "diphenolic acids" read -- Diphenolic Acid --; line 68, for "diphenolic acid" read -- Diphenolic Acid --.

Signed and sealed this 14th day of June 1960.

(SEAL)
Attest:

KARL H. AXLINE
Attesting Officer

ROBERT C. WATSON
Commissioner of Patents